US012583619B2

(12) United States Patent
Samy et al.

(10) Patent No.: US 12,583,619 B2
(45) Date of Patent: Mar. 24, 2026

(54) COLLISION AVOIDANCE METHODS AND SYSTEMS USING EXTERNAL LIGHTING SYSTEMS

(71) Applicant: HONEYWELL INTERNATIONAL INC., Charlotte, NC (US)

(72) Inventors: Saravana Venkatesh Narayana Samy, Madurai (IN); Gobinathan Baladhandapani, Madurai (IN); Anand Kutuva, Bangalore (IN); Sunit Kumar Saxena, Urbana, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 18/509,521

(22) Filed: Nov. 15, 2023

(65) Prior Publication Data

US 2025/0100711 A1     Mar. 27, 2025

(30) Foreign Application Priority Data

Sep. 21, 2023    (IN) .............................. 202311063426

(51) Int. Cl.
B64D 47/04          (2006.01)
G06T 7/70           (2017.01)
                    (Continued)

(52) U.S. Cl.
CPC ................ B64D 47/04 (2013.01); G06T 7/70 (2017.01); G06V 10/60 (2022.01); G06V 20/58 (2022.01)

(58) Field of Classification Search
CPC .......... B64D 47/04; G06T 7/70; G06V 10/60; G06V 20/58
See application file for complete search history.

(56) References Cited

U.S. PATENT DOCUMENTS

| | | | |
|---|---|---|---|
| 5,315,363 A | 5/1994 | Nettleton et al. | |
| 8,970,111 B2 | 3/2015 | Everett et al. | |
| (Continued) | | | |

FOREIGN PATENT DOCUMENTS

| | | |
|---|---|---|
| CN | 113064452 A | 7/2021 |
| CN | 114253292 A | 3/2022 |
| (Continued) | | |

*Primary Examiner* — Anne Marie Antonucci
*Assistant Examiner* — Nicholas Patrick Langhorne
(74) *Attorney, Agent, or Firm* — Ingrassia Fisher & Lorenz, LLP

(57) ABSTRACT

Vehicle systems and methods are provided for visually alerting a vehicle operator to a potential obstacle in the vicinity of a vehicle using an external lighting system associated with the vehicle. An exemplary method involves identifying an analysis portion of image data captured for a region external to the vehicle based at least in part on current status information associated with the vehicle, identifying an obstacle within the analysis portion of the image data based at least in part on ranging data for the analysis portion, and in response to identifying the obstacle, automatically adjusting an illumination axis associated with a lighting system to illuminate the obstacle, determining a current value for a contrast ratio associated with the obstacle relative to the analysis portion of the image data, and automatically adjusting one or more characteristics of the lighting system based at least in part on the current value.

20 Claims, 4 Drawing Sheets

(51) Int. Cl.
     *G06V 10/60*      (2022.01)
     *G06V 20/58*      (2022.01)

(56)           References Cited

U.S. PATENT DOCUMENTS

| | | | |
|---|---|---|---|
| 9,761,147 | B2 | 9/2017 | Buchmueller et al. |
| 10,571,933 | B2 | 2/2020 | Russell |
| 10,963,133 | B2 | 3/2021 | Mannon et al. |
| 11,117,570 | B1 * | 9/2021 | Broggi ................. G06V 20/586 |
| 11,565,827 | B2 | 1/2023 | Hessling-Von Heimendahl et al. |
| 2006/0171704 | A1 * | 8/2006 | Bingle ...................... B60R 1/04 |
| | | | 396/419 |
| 2011/0134249 | A1 * | 6/2011 | Wood ..................... G05D 1/106 |
| | | | 348/E5.09 |
| 2016/0114720 | A1 * | 4/2016 | Schlaug ................. B60Q 1/085 |
| | | | 362/523 |
| 2019/0032879 | A1 * | 1/2019 | Tsao ........................ B64D 47/04 |
| 2021/0150922 | A1 * | 5/2021 | Kanagarajan ............ G08G 5/22 |
| 2021/0245894 | A1 | 8/2021 | Batcheller et al. |
| 2022/0203975 | A1 * | 6/2022 | Hanna ................. G06V 20/597 |
| 2022/0224823 | A1 * | 7/2022 | Poloniewicz .......... H04N 23/61 |
| 2024/0412508 | A1 * | 12/2024 | Baulier ............... G06V 10/764 |

FOREIGN PATENT DOCUMENTS

| | | | | |
|---|---|---|---|---|
| CN | 107850902 | B | 4/2022 | |
| CN | 107757936 | B | 5/2022 | |
| WO | WO-2023049645 | A1 * | 3/2023 | ........... G06V 20/588 |

* cited by examiner

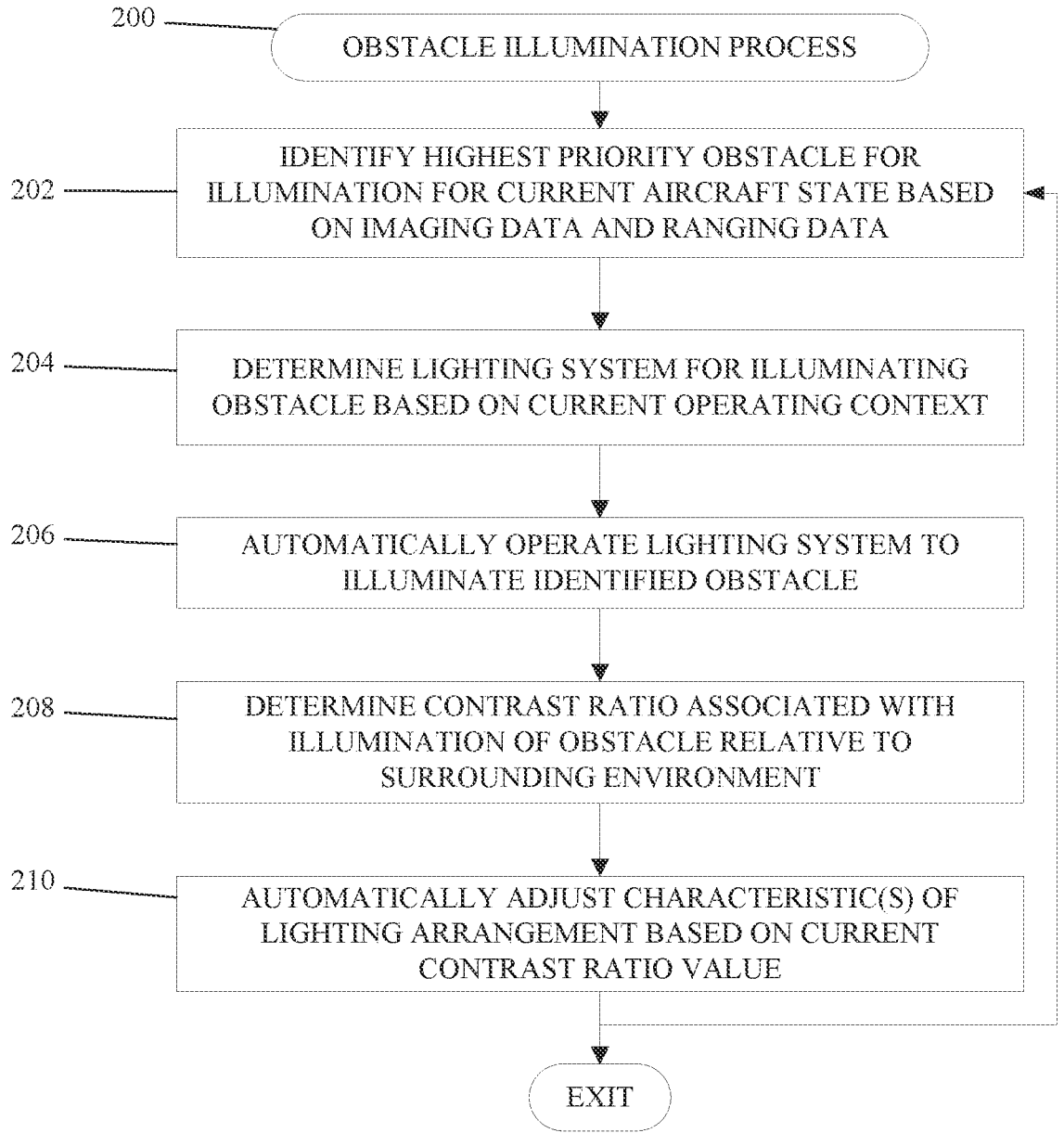

200 — OBSTACLE ILLUMINATION PROCESS

202 — IDENTIFY HIGHEST PRIORITY OBSTACLE FOR ILLUMINATION FOR CURRENT AIRCRAFT STATE BASED ON IMAGING DATA AND RANGING DATA

204 — DETERMINE LIGHTING SYSTEM FOR ILLUMINATING OBSTACLE BASED ON CURRENT OPERATING CONTEXT

206 — AUTOMATICALLY OPERATE LIGHTING SYSTEM TO ILLUMINATE IDENTIFIED OBSTACLE

208 — DETERMINE CONTRAST RATIO ASSOCIATED WITH ILLUMINATION OF OBSTACLE RELATIVE TO SURROUNDING ENVIRONMENT

210 — AUTOMATICALLY ADJUST CHARACTERISTIC(S) OF LIGHTING ARRANGEMENT BASED ON CURRENT CONTRAST RATIO VALUE

EXIT

FIG. 2

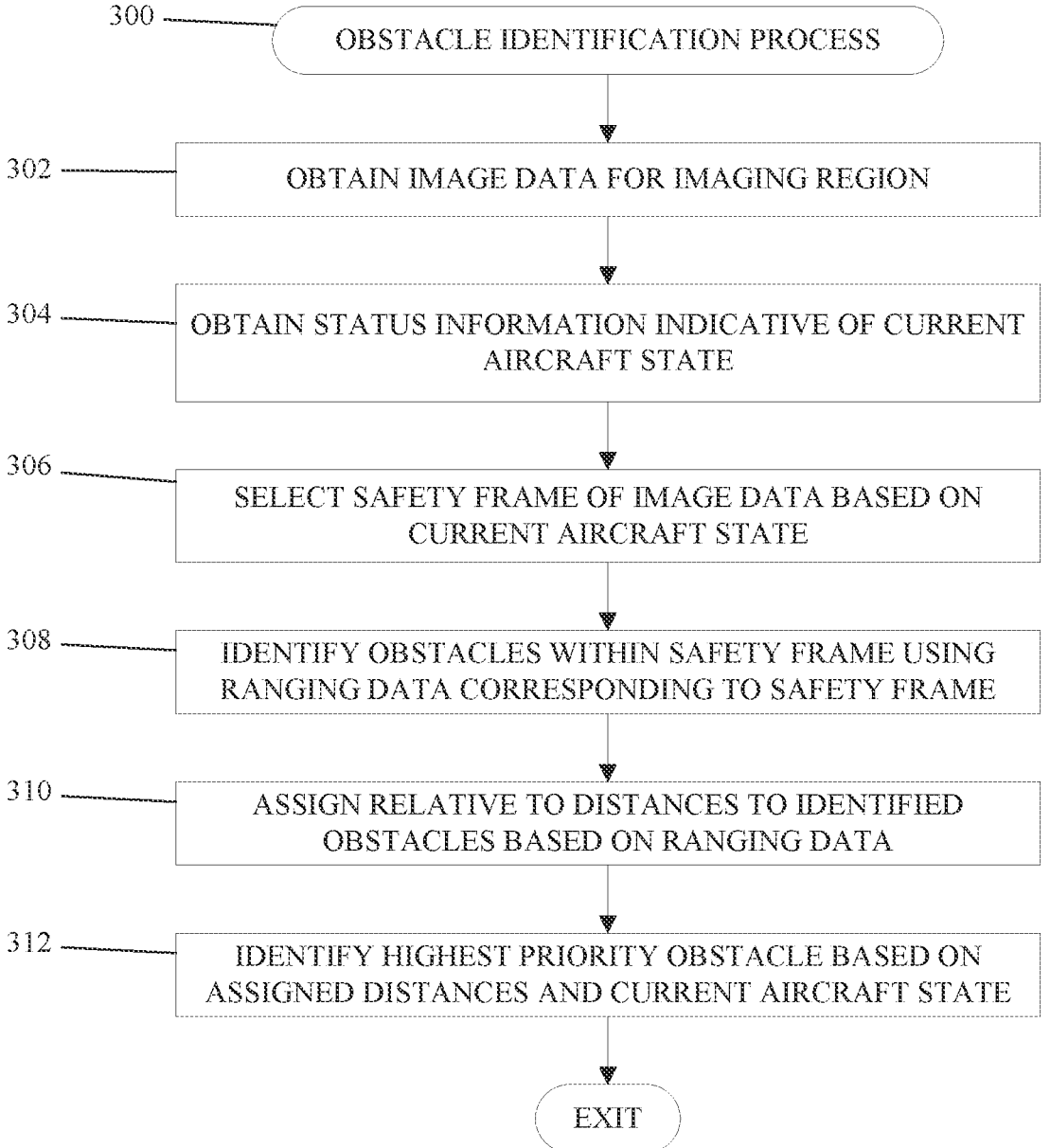

300 — OBSTACLE IDENTIFICATION PROCESS

302 — OBTAIN IMAGE DATA FOR IMAGING REGION

304 — OBTAIN STATUS INFORMATION INDICATIVE OF CURRENT AIRCRAFT STATE

306 — SELECT SAFETY FRAME OF IMAGE DATA BASED ON CURRENT AIRCRAFT STATE

308 — IDENTIFY OBSTACLES WITHIN SAFETY FRAME USING RANGING DATA CORRESPONDING TO SAFETY FRAME

310 — ASSIGN RELATIVE TO DISTANCES TO IDENTIFIED OBSTACLES BASED ON RANGING DATA

312 — IDENTIFY HIGHEST PRIORITY OBSTACLE BASED ON ASSIGNED DISTANCES AND CURRENT AIRCRAFT STATE

EXIT

FIG. 3

COLLISION AVOIDANCE METHODS AND SYSTEMS USING EXTERNAL LIGHTING SYSTEMS

CROSS REFERENCE TO RELATED APPLICATION

This application claims priority to India Provisional Patent Application No. 202311063426, filed Sep. 21, 2023, the entire content of which is incorporated by reference herein.

TECHNICAL FIELD

The subject matter described herein relates generally to vehicle systems, and more particularly, embodiments of the subject matter relate to automatically operating external lighting systems to facilitate collision avoidance for aircraft.

BACKGROUND

Many aircraft are equipped with one or more collision avoidance systems, such as a ground proximity warning system (GPWS), a terrain awareness and warning system (TAWS), an airborne collision avoidance system (ACAS), a traffic alert and collision avoidance system (TCAS) and/or the like. However, various types of modern aircraft such as unmanned aerial vehicles (UAVs), urban air mobility (UAM) aircraft, vertical take-off and landing (VTOL) aircraft or other unconventional or non-fixed wing aircraft may lack advanced collision avoidance systems that may be found on more conventional aircraft, for example, due to cost, weight, or other limitations on the ability to equip a particular type of aircraft with a particular collision avoidance system. At the same time, those aircraft may frequently operate at lower altitudes within airspaces or regions where the risk of collision may be greater, such as, for example, air taxis or UAM aircraft operating in an urban environment or within a congested uncontrolled (or non-towered) airspace. Accordingly, it is desirable to provide methods and systems to improve awareness of pilots or other aircraft operators to potential obstacles or collision risks and improve safety of operations for aircraft lacking dedicated collision avoidance systems. Other desirable features and characteristics will become apparent from the subsequent detailed description and the appended claims, taken in conjunction with the accompanying drawings and the foregoing technical field and background.

BRIEF SUMMARY

Vehicle systems and methods are provided for assigning operation of a vehicle by visually alerting a vehicle operator to a potential obstacle in the vicinity of a vehicle using an external lighting system associated with the vehicle. An exemplary method involves obtaining image data for a region external to the vehicle, identifying an analysis portion of the image data within the region based at least in part on current status information associated with the vehicle, identifying an obstacle within the analysis portion of the image data based at least in part on ranging data for at least a portion of the analysis portion of the image data, and in response to identifying the obstacle, automatically adjusting an illumination axis associated with a lighting system to illuminate the obstacle, determining a current value for a contrast ratio associated with the obstacle relative to the analysis portion of the image data, and automatically adjusting one or more characteristics of the lighting system based at least in part on the current value.

An apparatus for a non-transitory computer-readable medium is provided. The computer-readable medium stores computer-executable instructions that, when executed by a processing system, cause the processing system to obtain, from an imaging system associated with a vehicle, image data for a region external to the vehicle, identify an analysis portion of the image data within the region based at least in part on current status information associated with the vehicle, identify an obstacle within the analysis portion of the image data based at least in part on ranging data from a ranging system associated with the vehicle for at least a portion of the analysis portion of the image data, and in response to identifying the obstacle, automatically adjust an illumination axis associated with a lighting system associated with the vehicle to illuminate the obstacle, determine a current value for a contrast ratio associated with the obstacle relative to the analysis portion of the image data, and automatically adjust one or more characteristics of the lighting system based at least in part on the current value.

An embodiment of an aircraft system is also provided that includes an imaging system to obtain image data for a region external to an aircraft, a ranging system to obtain ranging data for the region external to the aircraft, one or more avionics systems onboard the aircraft to provide status information indicative of a current state of the aircraft, one or more lighting systems onboard the aircraft, and a control module coupled to the imaging system, the ranging system, the one or more avionics systems and the one or more lighting systems to provide an obstacle illumination service. The obstacle illumination service is configurable to identify an analysis portion of the image data within the region based at least in part on the current state of the aircraft, identify a priority obstacle within the analysis portion of the image data based at least in part on the ranging data for the analysis portion of the image data, automatically adjust an illumination axis associated with a lighting system of the one or more lighting systems to illuminate the priority obstacle, determine a current value for a contrast ratio associated with the priority obstacle relative to the analysis portion of the image data, and automatically adjust one or more characteristics of the lighting system based at least in part on the current value.

This summary is provided to describe select concepts in a simplified form that are further described in the Detailed Description. This summary is not intended to identify key or essential features of the claimed subject matter, nor is it intended to be used as an aid in determining the scope of the claimed subject matter.

Other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 2 is a flow diagram illustrating an exemplary obstacle illumination process suitable for implementation by the obstacle illumination system of FIG. 1;

FIG. 3 is a flow diagram illustrating an exemplary obstacle identification process suitable for implementation in connection with the obstacle illumination process of FIG. 2.

DETAILED DESCRIPTION

Figure 1:
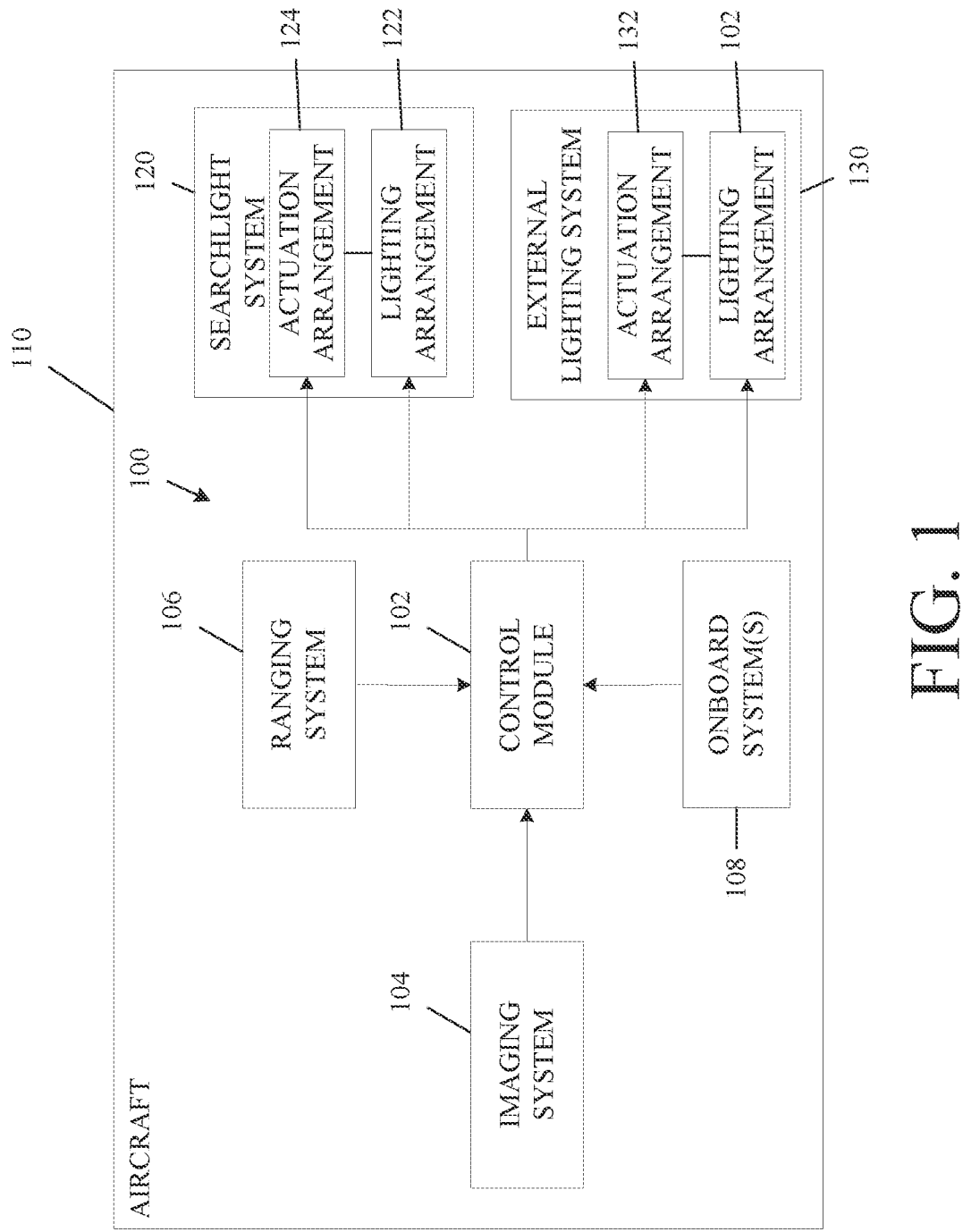
FIG. 1 is a block diagram illustrating an obstacle illumination system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to improving situational awareness with respect to potential obstacles or other collision risks for a vehicle during operation using a lighting system associated with the vehicle. For purposes of explanation, the subject matter is described herein primarily in the context of aircraft, where a searchlight system or other external lighting system is operable to illuminate a priority obstacle proximate the aircraft that poses a potential threat or risk of collision; however, the subject matter is not necessarily limited to use with aircraft and may be implemented in an equivalent manner for other types of vehicles (e.g., automotive vehicles, marine vessels, or the like). That said, exemplary embodiments may be described herein in the context of urban air mobility (UAM) vehicles, vertical takeoff and landing (VTOL) aircraft, helicopters or other rotorcraft that may operate in urban environments or other controlled airspaces.

As described in greater detail below, in exemplary implementations, an aircraft includes at least one external lighting system that is operable to illuminate an obstacle in a vicinity of the aircraft, where one or more characteristics of the illumination by the lighting arrangement are automatically adjusted to improve visibility of an illuminated obstacle based on the contrast ratio associated with the obstacle. In this regard, a portion of image data captured for a region encompassing a priority obstacle is analyzed to calculate or otherwise determine a current value for a contrast ratio associated with illumination of the priority obstacle relative to the surrounding environment within the portion of captured image data. Based on the contrast ratio, the characteristics of the illumination by the lighting arrangement are automatically adjusted to increase and/or decrease the contrast ratio to improve the visibility of the illuminated obstacle in relation to the ambient illumination of the surrounding environment.

In connection with automatically adjusting the illumination characteristics to regulate or otherwise manage the contrast ratio, the illumination axis associated with the lighting arrangement is also automatically adjusted to maintain illumination of the priority obstacle that is most likely to be relevant to future operation of the aircraft. In this regard, the lighting arrangement may effectively lock onto or track the priority obstacle until a different obstacle is identified that is more likely to pose a threat to the future operation of the aircraft. For example, based on the current aircraft attitude, speed, flight phase, and/or other contextual information characterizing the current status or operational state of the aircraft, captured image data may be continually analyzed to identify an analysis portion within the field of view that is most relevant to the future operation of the aircraft given the current status information, before analyzing the subset of image data within that analysis portion to identify the highest priority proximate obstacle that poses the greatest threat or risk from within that analysis portion. In this manner, the obstacles within the field of view that are not likely to be relevant given the current aircraft attitude, trajectory and/or status may be excluded from consideration by confining the analysis of the captured image data to the more limited analysis portion that is most relevant.

In exemplary implementations, to identify the proximate obstacle within the analysis portion of captured image data that is highest priority for raising operator awareness, ranging data captured by an onboard ranging device (e.g., lidar or another suitable ranging device) is overlaid, correlated or otherwise mapped to the image data to identify which obstacle within the analysis portion is closest to the ownship aircraft and/or is moving towards the ownship aircraft at the greatest rate (e.g., based on change in distance over successive samplings). In this regard, the ranging data and the captured image data may be analyzed in concert with another using conventional processing techniques (e.g., edge detection) to identify the boundaries of the respective obstacles observed within the analysis portion and assign respective distances to the respective obstacles based on the ranging data.

Once the highest priority obstacle proximate the ownship aircraft is identified using the ranging data, a subset of image data from within the analysis portion that corresponds to that obstacle is selected (e.g., the subset of image data within the confines of the boundaries or edges detected using the ranging data or other edge detection techniques) and utilized to estimate the position of the obstacle relative to the ownship aircraft. For example, using the ranging data along with edge detection, object detection or other image processing techniques, the subset of image data that belongs to or otherwise encompasses the higher priority is identified, and then utilized to determine the estimated position of the obstacle in the image domain (e.g., by determining a center or median pixel location for the priority obstacle). Based on the pixel distance between the estimated position of the priority obstacle in the pixel domain and a boundary pixel location associated with the analysis portion of image data, the current orientation of the imaging device, the current attitude of the aircraft and/or other current aircraft status information, a corresponding estimated position of the priority obstacle can be determined in a geographic coordinate domain or other geographic reference frame. Based on the estimated position of the priority obstacle relative to the current position of the aircraft (e.g., the current aircraft location and altitude), the orientation of an external lighting arrangement is automatically adjusted to slew the illumination beam axis to align with or otherwise focus on the estimated position of the highest priority obstacle proximate the aircraft.

Additionally, the selected obstacle subset of image data corresponding to the estimated position of the highest priority obstacle within the analysis portion is then utilized to calculate a dynamic contrast ratio value for the obstacle based on a relationship between the obstacle brightness associated with the selected obstacle subset of image data to the environmental brightness associated with the remaining subset of the image data within the analysis portion, excluding the obstacle subset of image data. In this regard, the dynamic contrast ratio value indicates the relative brightness, illumination or quality of visibility of the highest priority obstacle relative to the surrounding environment. Based on the dynamic contrast ratio value, the intensity of illumination associated with the illumination beam axis of the external lighting arrangement is automatically adjusted to increase and/or decrease the intensity of illumination to improve the dynamic contrast ratio for improved visibility of the highest priority obstacle or other human factors. For example, when the current value for the dynamic contrast ratio associated with the priority obstacle is below a threshold or target value, the intensity of illumination may be increased to improve visibility of the priority obstacle. On the other hand, when the current value for the dynamic contrast ratio associated with the priority obstacle is above the threshold or target value, the intensity of illumination may be decreased to improve visibility of the surrounding environment while preserving focused illumination of the prioritized obstacle.

As the aircraft travels, the image data and ranging data are continually analyzed to identify the highest priority obstacle proximate the aircraft that poses the greatest threat or risk and automatically adjust the illumination axis, the intensity and potentially other characteristics of the external lighting arrangement to maintain focus on the highest priority obstacle with the desired visibility for the aircraft operator. In this regard, as the highest priority obstacle changes during flight, the lighting system is intelligently and automatically adjusted to refocus and illuminate the updated priority obstacle of interest with the desired contrast ratio, thereby adapting to the evolving state of the aircraft substantially in real-time. Moreover, when the current phase of flight for the aircraft changes, or other contextual aspects of aircraft operation change, the particular external lighting system associated with the aircraft utilized to illuminate the highest priority obstacle may similarly change in an intelligent and automated manner. For example, in aircraft equipped with a searchlight system, the searchlight may be utilized to illuminate the highest priority obstacle when the aircraft is not in the process of conducting a search and rescue mission, where the searchlight is being separately controlled by the operator or other process, or engaged in takeoff or landing, where the searchlight may be locked on the heliport, vertiport, runway or other landing location. When the aircraft begins engaging in a search and rescue mission, or the flight phase changes to one where the searchlight system is needed to support other aspects of aircraft operation, a different external lighting system available for illuminating nearby obstacles may be automatically identified, enabled and operated in a corresponding manner (e.g., by adjusting the illumination axis and intensity) to maintain visibility of the highest priority proximate obstacles while the searchlight system is concurrently in use.

FIG. 1 depicts an exemplary embodiment of an obstacle illumination system 100 suitable for use with a vehicle 120. For purposes of explanation, the subject matter is described herein in the context of the vehicle 120 being realized as an aircraft 110; however, the subject matter is not necessarily limited to use with aircraft and may be implemented in the context of any other type of vehicle. In exemplary implementations, the aircraft 110 is realized as a UAM vehicle, a VTOL aircraft, an unmanned aerial vehicle (UAV), a helicopter, a rotorcraft, or another aircraft that includes one or more lighting systems 120, 130 for purposes of selectively illuminating a region or area external to the aircraft, such as, for example, a searchlight (e.g., for search and rescue operations), a landing light (e.g., to illuminate a landing pad), or the like.

In exemplary embodiments, the aircraft 110 includes a searchlight system 120 that includes a lighting arrangement 122 (or light head) mechanically coupled to an actuation arrangement 124 that is operable or actuatable to control the physical position and orientation of the lighting arrangement 122. In exemplary implementations, the lighting arrangement 122 includes one or more illumination elements, which may be realized as any sort of light source or source of electromagnetic radiation capable of emitting a directional beam of electromagnetic radiation having wavelengths within the frequency spectrum of visible light, such as, for example, one or more laser diodes, light-emitting diodes (LEDs), halogen lamps, or the like. Depending on the implementation, the lighting arrangement 122 may be retractable or otherwise mounted on or integrated with an exterior surface of the body of the aircraft 110 in a manner that allows the lighting arrangement 122 to extend relative to the body of the aircraft 110 to illuminate terrain or other objects at a desired spatial orientation relative to the body of the aircraft 110. In this regard, the lighting arrangement 122 may be configured to allow the beam of light emitted from its illumination element(s) to be swiveled or otherwise reoriented (e.g., by operation of the actuation arrangement 124) while in an extended (or nonretracted) state under control. For example, in some implementations, the lighting arrangement 122 may be retractable and configured to function as a searchlight or a landing light that is forward mounted or forward fit on the underside of the aircraft 110 to illuminate terrain or objects ahead of or beneath the aircraft 110.

The actuation arrangement 124 generally represents one or more motors or other suitable actuators, linkages or combinations thereof that are operable to control the orientation of the axis of illumination associated with the lighting arrangement 122. For example, the actuation arrangement 124 may include a pan control actuator that is operable to pan the illumination axis along with a tilt control actuator that is operable to tilt the illumination axis, where the pan and tilt control actuators are cooperatively operated in concert with one another to slew the illumination axis. In this regard, the lighting arrangement 122 may generally project a three-dimensional beam of light along a beam axis to land on the ground or a surface of an obstacle at beam axis touchdown, where the beam of light generally surrounds the beam axis and extends uniformly therefrom in a radial direction.

In exemplary embodiments, the searchlight system 120 is coupled to a control module 102 associated with the aircraft 110, which generally represents the processing system or other hardware, software, and/or firmware components configured to control operation of the searchlight system 120 and perform additional tasks and/or functions to support operation of the system 100, as described in greater detail below. Depending on the embodiment, the control module 102 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the control module 102 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the control module 102, or in any practical combination thereof. For example, in one or more embodiments, the control module 102 includes or otherwise accesses a data storage element (or memory), which may be realized as any sort of non-transitory short or long term storage media capable of storing programming instructions for execution by the control module 102. The code or other computer-executable programming instructions, when read and executed by the control module 102, cause the control module 102 to support or otherwise perform certain tasks, operations, functions, and/or processes described herein.

In addition to the searchlight system 120, the illustrated system 100 includes an additional external lighting system 130 that is operable to illuminate obstacles in a vicinity of the aircraft 110. Similar to the searchlight system 120, the external lighting system 130 includes a lighting arrangement 132 that is mechanically coupled to an actuation arrangement 134 that is operable or actuatable to control the orientation of the lighting arrangement 132. In this regard, the lighting arrangement 132 includes any number or configuration of illumination elements that are manipulable or otherwise adjustable to focus one or more beams of electromagnetic radiation having wavelengths within the frequency spectrum of visible light that are capable of being directed and focused on a common touchdown point to illuminate terrain or other objects at a desired spatial orientation relative to the body of the aircraft 110. The actuation arrangement 134 generally represents the motor or other actuator operable to control the orientation of the axis of illumination associated with the lighting arrangement 132 to project one or more beams of light along beam axis to land on an obstacle at beam axis touchdown. For example, in one implementation, the external lighting system 130 may be realized as a landing light system, taxi light system or the like that includes illumination elements that are mounted on the underside of the wings of the aircraft 110 and steerable or otherwise operable to focus on a common touchdown point.

As described in greater detail below in the context of FIG. 2, in exemplary implementations, the control module 102 is configurable to execute or otherwise provide an obstacle illumination service that analyzes data from onboard devices or systems 104, 106, 108 to identify a proximate external obstacle in a vicinity of the aircraft 110 that poses the highest risk or threat to future operation of the aircraft 110 based on the current state of the aircraft 110. The obstacle illumination service automatically operates one of the lighting systems 120, 130 to illuminate that highest priority proximate obstacle substantially in real-time, and dynamically adjusts the operation of the lighting systems 120, 130 in response to changes to the state of the aircraft and/or the highest priority obstacle, as described in greater detail below.

In exemplary embodiments, the control module 102 is coupled to an imaging system 104 that includes one or more imaging devices that are configured to capture, sense, or otherwise obtain real-time imagery corresponding to an imaging region proximate the aircraft 110 and provide the captured image data corresponding to the surrounding environment external to the aircraft 110 to the control module 102 for subsequent processing and analysis. For example, in some embodiments, the imaging system 104 include an infrared (IR) video camera or a millimeter wave (MMW) video camera that is mounted on the aircraft 110 and calibrated to align the imaging region with a forward line-of-sight associated with the aircraft 110 to effectively capture a forward looking view of the imaging region. That said, it should be appreciated that the subject matter described herein is not limited to any particular type or configuration of imaging devices associated with the imaging system 104.

In exemplary embodiments, the control module 102 is also coupled to a ranging system 106 that includes one or more ranging devices that are configured to obtain ranging data indicative of the relative distance and location of different obstacles in relation to the aircraft 110. For example, the ranging system 106 may include or otherwise incorporate lidar, radar, sonar or other suitable ranging devices or techniques, where the ranging device(s) associated with the ranging system 106 are configured to periodically or continually scan the external environment about the aircraft 110 to obtain ranging data for any obstacles in the vicinity of the aircraft 110 that are within range of the ranging system 106. Again, it should be appreciated that the subject matter described herein is not limited to any particular type or configuration of ranging devices associated with the ranging system 106.

As described in greater detail below, in exemplary embodiments, the obstacle illumination service at the control module 102 overlays, maps or otherwise correlates the ranging data with the imaging data to identify the presence of obstacles within the vicinity of the aircraft and prioritize the relative risk or threat associated with the obstacles with respect to the operation of the aircraft based on the current state of the aircraft 110. In this regard, the control module 102 is communicatively coupled to one or more systems 108 onboard the aircraft 110 to obtain status information indicative of the current state of the aircraft 110 substantially in real-time. For example, in the context of an aircraft 110, the onboard systems 108 may include one or more avionics systems that support navigation, flight planning, and other aircraft control functions, and in practice, will likely include one or more of the following avionics systems suitably configured to support operation of the aircraft: a flight management system (FMS), a navigation system, an inertial measurement system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. In this regard, the status information obtained from the onboard system 108 may include data indictive of the current altitude of the aircraft 110, the current speed of the aircraft 110, the current attitude or orientation of the aircraft 110, the current flight phase of the aircraft 110, and/or the like.

FIG. 2 depicts an exemplary embodiment of an obstacle illumination process 200 suitable for implementation by an obstacle illumination service associated with an aircraft system to automatically and dynamically illuminate a priority obstacle that poses a potential risk or threat to future operation of the aircraft. The various tasks performed in connection with the illustrated process may be implemented using hardware, firmware, software executed by processing circuitry, or any combination thereof. For illustrative purposes, the following description may refer to elements mentioned above in connection with FIG. 1. In practice, portions of the obstacle illumination process 200 may be performed by different elements of an aircraft system. That said, exemplary embodiments are described herein in the context of the obstacle illumination process 200 being primarily performed by an obstacle illumination system executed or implemented at a control module 102 onboard an aircraft 110. It should be appreciated that the obstacle illumination process 200 may include any number of additional or alternative tasks, the tasks need not be performed in the illustrated order and/or the tasks may be performed concurrently, and/or the obstacle illumination process 200 may be incorporated into a more comprehensive procedure or process having additional functionality not described in detail herein. Moreover, one or more of the tasks shown and described in the context of FIG. 2 could be omitted from a practical embodiment of the obstacle illumination process 200 as long as the intended overall functionality remains intact.

Referring to FIG. 2, with continued reference to FIG. 1, in exemplary embodiments, the obstacle illumination process 200 begins by identifying or otherwise determining the highest priority obstacle for illumination for the current aircraft state based at least in part on the imaging data and ranging data captured for the external environment in the vicinity of the aircraft (task 202). As described in greater detail below in the context of FIG. 3, in exemplary implementations, the obstacle illumination service utilizes the current attitude and potentially other current aircraft state information (e.g., altitude, heading, yaw rate, and/or the like) to preferentially identify a portion of the captured image data from the imaging system 104 for analysis that corresponds to the region or portion of the external environment proximate the aircraft 110 that is most likely to be in the field of view of a pilot or other operator based on the current aircraft attitude. For purposes of explanation, the analysis portion of the captured image data that is determined or otherwise identified using the current attitude of the aircraft and selected for analysis may alternatively be referred to herein as the safety frame of image data. After determining the relative orientation or position of the safety frame and defining the corresponding boundaries or confines of the safety frame based on the current aircraft state, the obstacle illumination service obtains the current or most recent set of ranging data from the ranging system 106 and overlays, maps or otherwise correlates the ranging data for the safety frame to the captured image data for the safety frame to assign distances to respective obstacles identified within the safety frame of image data (e.g., using edge detection or other obstacle detection techniques which are not germane to this disclosure).

In one or more exemplary implementations, the obstacle illumination service selects or otherwise identifies the proximate obstacle detected within the safety frame that is closest to the aircraft 110 as the highest priority obstacle for illumination. That said, in other implementations, the obstacle illumination service may analyze the current aircraft dynamics (e.g., speed, heading, yaw rate, vertical speed or descent rate, flight path angle, and/or the like) and/or the estimated dynamics associated with the respective obstacles (e.g., based on changes to relative distances from the ownship aircraft 110 over time) to select or otherwise identify a priority obstacle, from among the detected obstacles within the safety frame, that the aircraft 110 is anticipated to come closest to or otherwise encroach within a threshold distance of at the earliest point in time. In this regard, it should be appreciated that the subject matter described herein is not limited to any particular scheme or criteria for identifying the proximate obstacle that is the highest priority for illumination or otherwise poses the highest risk or threat to future operation of the aircraft 110.

Still referring to FIG. 2, after identifying the priority obstacle for illumination, exemplary implementations of the obstacle illumination process 200 identify or otherwise determine the onboard lighting system for illuminating that obstacle based on the current operating context for the aircraft (task 204). In this regard, depending on one or more of the current flight phase or other contextual operating state associated with the aircraft 110, the current state of the onboard lighting systems 120, 130, the current aircraft attitude, the current aircraft altitude and/or potentially other factors, the obstacle illumination service intelligently and automatically determines which lighting system 120, 130 should be utilized to illuminate the priority obstacle. For example, in situations where the searchlight system 120 is currently in use under manual control (e.g., as part of a search and rescue operation), the obstacle illumination service may automatically determine a different external lighting system 130 should be utilized to illuminate the obstacle. In other situations, when the current flight phase for the aircraft 110 indicates that the aircraft 110 is in the process of performing a takeoff, landing, climb, approach, or other phase of operation where the searchlight system 120 is utilized (or is likely to be utilized) to illuminate a runway, heliport, vertiport, or other landing location, the obstacle illumination service may automatically determine a different external lighting system 130 should be utilized to illuminate the obstacle. In yet other situations, when the searchlight system 120 is available or not currently in use, the obstacle illumination service may automatically determine that the searchlight system 120 should be utilized to illuminate the obstacle (e.g., to maintain availability of other external lighting systems 130 for other functions). In this regard, it should be appreciated that the subject matter described herein is not limited to any particular scheme or criteria for identifying the particular lighting system 120, 130 for illuminating a priority obstacle.

After determining which lighting system to utilize, the obstacle illumination process 200 automatically operates the selected lighting system to illuminate the highest priority obstacle proximate the aircraft (task 206). In this regard, the obstacle illumination service at the control module 102 generates or otherwise provides commands to the respective actuation arrangement 124, 134 associated with the selected lighting system 120, 130 to adjust the position and/or orientation of its respective lighting arrangement 122, 132 to slew the illumination beam axis to focus or otherwise align the touchdown point of the beam axis on or at the estimated position of the priority obstacle identified for illumination. In concert with providing actuation commands to adjust the position or orientation of the illumination axis associated with the selected lighting system 120, 130, the control module 102 also generates or otherwise provides commands to the respective lighting arrangement 122, 132 associated with the selected lighting system 120, 130 to emit visible light or other electromagnetic radiation along the beam axis to illuminate the priority obstacle.

In exemplary embodiments, after actuating or otherwise operating the selected lighting system to illuminate the highest priority obstacle proximate the aircraft, the obstacle illumination process 200 calculates or otherwise determines a value for a contrast ratio associated with the illumination of the obstacle relative to its surrounding environment and automatically adjusts one or more characteristics of the lighting arrangement illuminating the obstacle based on the current value for the contrast ratio (tasks 208, 210). In this regard, the obstacle illumination service analyzes the captured image data from the imaging system 104 to calculate or otherwise determine the value for a dynamic contrast ratio that reflects the perceived brightness of the priority obstacle being illuminated relative to the ambient brightness of the surrounding scene of the external environment within the field of view of the imaging system 104. For example, in an exemplary implementation, the obstacle illumination service at the control module 102 calculates the dynamic contrast ratio by limiting the analysis to the safety frame of captured image data, where the mean or average brightness for the region of pixels corresponding to the highest priority proximate obstacle being illuminated is divided by or otherwise compared to the mean or average brightness for the entirety of the safety frame of captured image data (e.g., by averaging the brightness across all pixels of the safety frame).

The obstacle illumination service compares the current dynamic contrast ratio associated with the illuminated obstacle to one or more thresholds and determines whether to adjust one or more characteristics of the illumination of the obstacle based on the relationship between the current dynamic contrast ratio and the threshold(s). For example, when the current dynamic contrast ratio value is greater than a desired or targeted contrast ratio value that indicates that the priority obstacle is over-illuminated, such that visibility of the surrounding environment could be impacted or other human factors concerns, the obstacle illumination service at the control module 102 determines that the intensity of illumination should be reduced and provides corresponding commands to the respective lighting arrangement 122, 132 of the selected lighting system 120, 130 to reduce the intensity of radiation emitted by the respective lighting arrangement 122, 132. In this regard, in some implementations, the obstacle illumination service may calculate or otherwise determine an amount by which to adjust the intensity based on the difference between the current dynamic contrast ratio value and the targeted contrast ratio value, and then determine a corresponding intensity adjustment command for the respective lighting arrangement 122, 132 that is configured to result in the determined amount of intensity adjustment. In a similar manner, when the current dynamic contrast ratio value is less than a targeted contrast ratio value that indicates that the priority obstacle is under-illuminated, such that visibility of the priority obstacle may be impaired given the ambient brightness of the surrounding environment or other human factors concerns, the obstacle illumination service at the control module 102 determines that the intensity of illumination should be increased and provides corresponding commands to the respective lighting arrangement 122, 132 of the selected lighting system 120, 130 to increase the intensity based on the difference between the current dynamic contrast ratio value and the targeted contrast ratio value. It should be appreciated that the subject matter described herein is not limited to any particular number of thresholds or criteria for dynamically adjusting the intensity or other illumination characteristics of the selected lighting system 120, 130.

In one or more exemplary implementations, the obstacle illumination process 200 repeats throughout operation of the aircraft 110 to automatically and dynamically adjust operation of the lighting systems 120, 130 to provide the desired illumination of the current highest priority proximate obstacle in the vicinity of the aircraft 110. In this regard, as the attitude and/or position of the aircraft 110 changes over time relative to the surrounding external environment, the highest priority obstacle identified by the obstacle illumination process 200 may vary to reflect the current state or pose of the aircraft 110. When the obstacle illumination process 200 identifies a different obstacle for illumination based on the current aircraft state and the updated imaging and ranging data (e.g., task 202), the obstacle illumination process 200 automatically and dynamically adjusts the position and/or orientation of the selected lighting system 120, 130 to slew the illumination beam axis to illuminate the new highest priority obstacle (e.g., task 206) and then automatically and dynamically adjusts the intensity or other characteristics of the selected lighting system 120, 130 to achieve the desired contrast ratio for the new obstacle of interest.

In a similar manner, as the flight phase or other contextual information pertaining to the operation of the aircraft 110 changes, the obstacle illumination process 200 may automatically and dynamically select a different lighting system 120, 130 to be utilized and then automatically initiates operation of the selected lighting system 120, 130 accordingly to illuminate the obstacle in lieu of the lighting system 120, 130 that was previously utilized. For example, when the flight phase and/or other contextual operational information from the onboard systems 108 indicates that the searchlight system 120 should be utilized as a landing light (e.g., to illuminate a runway, heliport, vertiport, or the like), the obstacle illumination process 200 may cease operation of the searchlight system 120 to illuminate the priority obstacle and transition to operating another external lighting system 130 to illuminate the priority obstacle (e.g., task 204). In this manner, the obstacle illumination process 200 is capable of automatically and dynamically changing the lighting system used to illuminate obstacles based on context, while also automatically and dynamically controlling the lighting system(s) to illuminate the highest priority obstacle given the current state of the aircraft 110.

FIG. 3 depicts an exemplary embodiment of an obstacle identification process 300 suitable for implementation by an obstacle illumination service associated with an aircraft system to automatically and dynamically identify and determine the position of a priority obstacle proximate the aircraft for illumination. In exemplary implementations, the obstacle identification process 300 is performed in connection with the obstacle illumination process 200 of FIG. 2 to automatically and dynamically identify a proximate obstacle of interest for illumination (e.g., at task 202) before automatically and dynamically operating a lighting system associated with the aircraft to illuminate the identified obstacle. The various tasks performed in connection with the illustrated process may be implemented using hardware, firmware, software executed by processing circuitry, or any combination thereof. For illustrative purposes, the following description may refer to elements mentioned above in connection with FIG. 1. In practice, portions of the obstacle identification process 300 may be performed by different elements of an aircraft system. That said, exemplary embodiments are described herein in the context of the obstacle identification process 300 being primarily performed by an obstacle illumination system executed or implemented at a control module 102 onboard an aircraft 110. It should be appreciated that the obstacle identification process 300 may include any number of additional or alternative tasks, the tasks need not be performed in the illustrated order and/or the tasks may be performed concurrently, and/or the obstacle identification process 300 may be incorporated into a more comprehensive procedure or process having additional functionality not described in detail herein. Moreover, one or more of the tasks shown and described in the context of FIG. 3 could be omitted from a practical embodiment of the obstacle identification process 300 as long as the intended overall functionality remains intact.

The obstacle identification process 300 receives or otherwise obtains a frame of image data for an imaging region corresponding to a forward-looking field of view associated with the aircraft along with concurrent status information indicative of the current aircraft state that is utilized to extract, select, or otherwise identify a safety frame subset of image data within the frame of image data for analysis based on the current aircraft state (tasks 302, 304, 306). In exemplary implementations, the obstacle illumination service at the control module 102 utilizes current aircraft status data indicative of the current attitude of the aircraft 110 and potentially other current aircraft state information (e.g., the current altitude, heading, yaw rate, speed and/or the like) to identify a corresponding portion of the aircraft's forward-looking field of view that is most likely to be of interest to a pilot or other operator with respect to the current and/or future operation of the aircraft 110, and then selects or otherwise identifies the corresponding subset of captured image data from the imaging system 104 that overlaps, aligns with, or otherwise encompasses that analysis portion of the field of view to arrived at a safety frame of pixels. In this regard, the relative position or orientation of the analysis portion for the safety frame within the overall frame of captured image data may correspond to or otherwise be influenced by the current attitude of the aircraft 110 and the current direction and/or orientation in which the aircraft 110 is moving, while the area or size of the safety frame (e.g., the height and width) may correspond to or otherwise be influenced by the current altitude of the aircraft 110, the current speed of the aircraft 110, and/or the like. Thus, the relative position and geometry of the safety frame may be influenced by the current aircraft state and current aircraft dynamics to represent the region within the forward-looking field of view where the aircraft 110 is most likely to encounter an obstacle in the future, and may vary dynamically depending on current aircraft state.

After identifying the safety frame for analysis, the obstacle identification process 300 identifies potential obstacles within the safety frame and assigns relative distances to the identified obstacles using the ranging data corresponding to the safety frame (tasks 308, 310). Based on the relative position or orientation of the safety frame in relation to the forward-looking field of view for the aircraft 110 and the geometry or dimensions of the safety frame, the obstacle illumination service at the control module 102 identifies a corresponding subset of ranging data from the ranging system 106 that is collocated with or otherwise overlaps the safety frame. In this regard, the overlapping or overlaid subset of ranging data effectively provides a contour map of the safety frame. Using the correspondence between the concurrent overlapping ranging data and the image data, the obstacle illumination service at the control module 102 may assign relative distance to respective pixels within the safety frame using the overlapping or overlaid ranging data. Thereafter, the obstacle illumination service at the control module 102 may perform edge detection, object detection or classification, and/or other image processing techniques to analyze the safety frame of image data and the overlaid ranging data to detect or otherwise identify obstacles within the safety frame. In this regard, each obstacle may correspond to a discrete and unique subset of image data and corresponding ranging data within the safety frame.

In some implementations, for each detected obstacle, the obstacle illumination service may calculate, estimate or otherwise determine a representative center position of the obstacle within the safety frame (e.g., by identifying the pixel location corresponding to the geometric mean pixel within the subset of pixels corresponding to the obstacle) and then calculate, estimate or otherwise determine an estimated distance to be assigned to the respective obstacle (e.g., by averaging the relative distances assigned to respective pixels within the subset of pixels corresponding to the obstacle). Thus, each obstacle may be assigned a representative position and relative distance based on the respective subset of overlapping image data and ranging data assigned to that obstacle. Based on the orientation of the imaging devices of the imaging system 104 with respect to the aircraft 110, a representative pixel location assigned to an obstacle may be mapped to a corresponding orientation or angular position of the obstacle relative to the aircraft 110, with the relative orientation and distance assigned to the obstacle being utilized to calculate or otherwise determine an estimated geographic position (e.g., geographic location and altitude) associated with the obstacle. In one or more implementations, the estimated position of an obstacle is determined by based at least in part on a pixel distance between the representative pixel location of the obstacle within the safety frame and a reference pixel location associated with the safety frame (e.g., the center pixel location or a boundary pixel location for the safety frame), which, in turn may be mapped or converted to an angular displacement that can be utilized to determine the angular position of the obstacle in relation to imaging system 104, which, in turn, may be referenced to the orientation of the aircraft 110.

After identifying obstacles within the safety frame and assigning distances to the respective obstacles, the obstacle identification process 300 identifies or otherwise determines a highest priority obstacle for illumination within the safety frame based on the assigned distances and the current aircraft state (task 312). In this regard, in some implementations, the obstacle illumination service may identify the obstacle closest to the aircraft 110 as the highest priority obstacle for illumination, for example, based on the distance between the estimated positions of the respective obstacles and the current position of the aircraft 110 or by identifying the minimum assigned distance from among the distances assigned to the detected obstacles. In yet other embodiments, the obstacle illumination service may utilize the estimated geographic positions and assigned distances assigned to the respective obstacles to calculate or otherwise determine which obstacle within the safety frame poses the highest risk or threat to future operation of the aircraft 110 using the current aircraft state. For example, the current aircraft speed, heading, and potentially other aircraft dynamics along with potentially other aircraft status information (e.g., flight phase, flight plan, etc.) may be utilized to calculate or otherwise determine an anticipated trajectory for the aircraft 110 and identify the obstacle within the safety frame that is closest to the anticipated trajectory or otherwise poses the highest risk or threat to the anticipated trajectory. In this regard, in addition to consideration of the current aircraft state, various implementations may also account for characteristics associated with the respective obstacles within the safety frame. For example, object classification or other image classification techniques may be applied to the safety frame of image data to classify or otherwise identify an obstacle as a particular type of obstacle (e.g., terrain, building, vehicle, and/or the like), and then identify the highest priority proximate obstacle based on the particular type of obstacle. Thus, in some implementations, a vehicle or other moving obstacle detected within the safety frame may be prioritized over a building, a terrain feature, or another fixed obstacle. In this regard, changes in the assigned distance or other changes to the image data and/or ranging data assigned to a particular obstacle may be utilized to calculate or otherwise determine one or more characteristics associated with the obstacle, which, in turn, may be utilized to estimate future trajectories or locations of the respective obstacles in relation to the future aircraft trajectory. Accordingly, it should be appreciated that the subject matter described herein is not limited to any particular prioritization scheme or algorithm for determining the highest priority obstacle within the safety frame for illumination.

In exemplary implementations, the obstacle identification process 300 is repeated in connection with the obstacle illumination process 200 to continually identify the highest priority obstacle for illumination and automatically and dynamically update the highest priority obstacle as the aircraft travels. In this manner, the obstacle identification process 300 may continually provide information identifying the estimated position of the current highest priority obstacle, the estimated distance to the current highest priority obstacle, and/or the like to the obstacle illumination process 200, which, in turn, is utilized to determine corresponding actuation commands for operating the actuation arrangement 124, 134 of the selected lighting system 120, 130 to effectively lock the illumination beam axis on the highest priority obstacle until automatically slewing the illumination beam axis to an updated obstacle as the current aircraft state changes.

Figure 4:
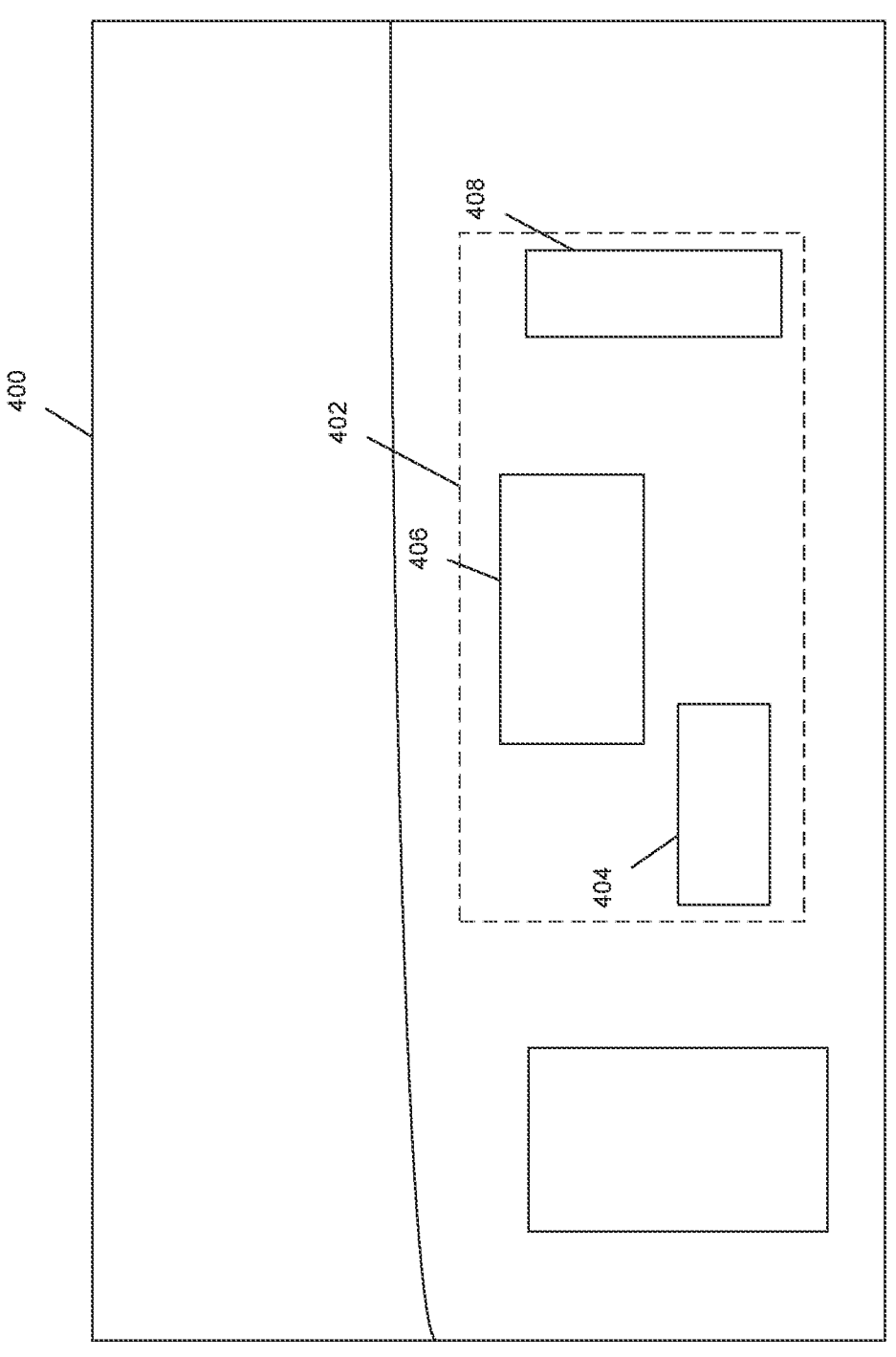
FIG. 4 depicts an exemplary relationship between a safety frame portion of a captured frame of image data selected for analysis in connection with an exemplary implementation of the obstacle illumination process of FIG. 2 incorporating the obstacle identification process of FIG. 3 in an exemplary embodiment.

FIG. 4 depicts an exemplary frame 400 of image data of a forward-looking field of view captured by an imaging system 104 onboard an aircraft 110 suitable for use with the obstacle illumination process 200 and the obstacle identification process 300. Referring to FIG. 4 with continued reference to FIGS. 1-3, based at least in part on the current attitude or orientation of the aircraft 110, the obstacle illumination service at the control module 102 calculates or otherwise determines the relative position and dimensions for a safety frame portion 402 of the captured image frame 400 for analysis (e.g., tasks 302, 304, 306). For example, the obstacle illumination service may utilize the current attitude and speed of the aircraft 110 to calculate or otherwise determine a reference angular position or orientation corresponding to a center of the safety frame 402, and then utilize the current altitude, speed, flight phase, and/or other status information to calculate or otherwise determine the dimensions for the safety frame 402 centered at that reference position. After identifying the safety frame portion 402 of the captured image frame 400 for analysis, the obstacle illumination service overlays or otherwise correlates the subset of ranging data from the ranging system 106 that overlaps the safety frame portion 402 to the corresponding pixel locations within the safety frame portion 402, and then applies one or more edge detection, object detection, object classification and/or other image processing techniques to detect or otherwise identify the presence of obstacles 404, 406, 408 within the safety frame portion 402 of the image (e.g., task 308). After identifying and determining the relative positions and dimensions of the respective obstacles 404, 406, 408, that is, the range of pixel locations within the safety frame portion 402 corresponding to the respective obstacle 404, 406, 408, the obstacle illumination service utilizes the corresponding subsets of ranging data mapped to the respective subset of pixels corresponding to a respective obstacle 404, 406, 408 to assign relative distances to the obstacles 404, 406, 408 (task 310).

Based at least in part on the relative distances assigned to the detected obstacles 404, 406, 408 within the safety frame 402, the obstacle illumination service identifies which of the detected obstacles 404, 406, 408 within the safety frame 402 proximate the aircraft 110 poses the greatest risk or threat to future operation of the aircraft 110 and is therefore the highest priority obstacle 404, 406, 408 for illumination, as described above (e.g., tasks 202, 312). For example, when a first obstacle 404 within the safety frame 402 is identified for illumination, the obstacle illumination service automatically selects a lighting system 120, 130 to be utilized to illuminate the priority obstacle 404 and automatically operates the actuation arrangement 124, 134 associated with the selected lighting system 120, 130 to align the illumination beam axis associated with the selected lighting system 120, 130 with the relative orientation or angular position from the ownship aircraft 110 to the estimated center position of the priority obstacle 404 to achieve beam axis touchdown on the priority obstacle 404 (e.g., tasks 204, 206). After illuminating the highest priority proximate obstacle 404, the obstacle illumination service calculates or otherwise determines a dynamic contrast ratio value associated with the obstacle 404, for example, based on the ratio of the average brightness of the pixels associated with the illuminated obstacle 404 to the average brightness of the remaining subset of pixels within the safety frame 402 (e.g., task 208). Based on the contrast ratio value, the obstacle illumination service automatically adjusts the intensity or other characteristics of the lighting arrangement 122, 132 of the selected lighting system 120, 130 to achieve the desired contrast ratio between the priority obstacle 404 and the surrounding environment within the safety frame 402 to improve visibility of the priority obstacle 404 or otherwise optimize human factors with respect to the safety frame 402 (e.g., the region of the external environment most likely of interest to the pilot or other operator).

Thereafter, as the aircraft 110 travels, the relative position and/or dimensions of the safety frame 402 may dynamically vary with respect to the captured image frame 400 to reflect the current attitude and/or altitude of the aircraft 110. As the subset of image data designated as part of the safety frame 402 varies, the obstacle illumination service repeats the obstacle identification process 300 to automatically detect or otherwise identify when a different obstacle poses a greater risk or threat to future operation of the aircraft 110, and in response, automatically adjusts operation of the selected lighting system 120, 130 to illuminate the new highest priority proximate obstacle. For example, in response to identifying a different obstacle 408 as the highest priority obstacle while the first obstacle 404 is being illuminated, the obstacle illumination service automatically operates the actuation arrangement 124, 134 associated with the selected lighting system 120, 130 to slew the illumination beam axis to a different relative orientation or angular position from the ownship aircraft 110 to the estimated center position of the updated priority obstacle 408 (e.g., tasks 204, 206). After adjusting the lighting system 120, 130 to illuminate a different obstacle 408, the obstacle illumination service calculates or otherwise determines a dynamic contrast ratio value associated with the updated priority obstacle 408 to dynamically adjust the intensity or other characteristics of the lighting arrangement 122, 132 of the selected lighting system 120, 130 to achieve the desired contrast ratio between the updated priority obstacle 408 and the surrounding environment within the safety frame 402, in a similar manner as described above.

By virtue of the subject matter described herein, a pilot or other operator of an aircraft may be visually alerted or notified of a proximate obstacle that is most likely to impact the current or future operation of the aircraft by operation of an external lighting system, and by using imaging and ranging devices or systems associated with the aircraft without reliance on dedicated collision avoidance systems onboard the aircraft. In this manner, pilots or other human operators may achieve greater situational awareness with respect to the surrounding environment when operating different types of aircraft or vehicles, which may lack onboard collision avoidance systems, and which may be operated in different types of airspaces or areas, which may lack air traffic control, detailed terrain mapping, and/or the like that would otherwise facilitate collision avoidance.

For the sake of brevity, conventional techniques related to avionics systems, lighting systems, ranging, image processing, human factors, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assisting operation of a vertical take-off and landing (VTOL) aircraft, the method comprising:

obtaining image data for a region external to the VTOL aircraft;

identifying an analysis portion of the image data within the region based at least in part on a current attitude associated with the VTOL aircraft;

identifying a priority obstacle within the analysis portion of the image data from among a plurality of obstacles within the image data based at least in part on ranging data corresponding to a discrete subset of the analysis portion of the image data corresponding to the priority obstacle;

selecting a lighting system of a plurality of lighting systems associated with the VTOL aircraft based on a current flight phase of the VTOL aircraft; and in response to identifying the priority obstacle:

automatically adjusting an illumination axis associated with the lighting system to illuminate the priority obstacle by aligning the illumination axis with an estimated position of the priority obstacle;

dynamically determining a current value for a contrast ratio associated with the discrete subset of the image data encompassing the priority obstacle relative to a remaining subset of the image data within the analysis portion of the image data corresponding to a surrounding environment; and automatically adjusting an intensity of illumination associated with the illumination axis of the lighting system based at least in part on a difference between the current value and a targeted contrast ratio value between the priority obstacle and the surrounding environment within the analysis portion of the image data.

2. The method of claim 1, wherein identifying the analysis portion comprises:

determining a safety frame for analysis within the region based at least in part on a current altitude of the VTOL aircraft; and selecting an analysis subset of the image data corresponding to the safety frame, wherein the analysis portion comprises the analysis subset of the image data.

3. The method of claim 2, wherein identifying the priority obstacle comprises identifying the priority obstacle within the safety frame from among the plurality of obstacles within the safety frame based at least in part on an overlay of the ranging data for the safety frame with the analysis subset of the image data corresponding to the safety frame.

4. The method of claim 3, wherein dynamically determining the current value for the contrast ratio associated with the priority obstacle comprises:

calculating a dynamic contrast ratio value associated with the priority obstacle within the safety frame based on a relationship between a first brightness associated with the discrete subset of the analysis subset of the image data and a second brightness associated with the remaining subset of the analysis subset of the image data.

5. The method of claim 1, wherein automatically adjusting the intensity of illumination associated with the illumination axis of the lighting system comprises:

increasing the intensity of illumination associated with the illumination axis of a lighting arrangement when the current value is less than the targeted contrast ratio value; and decreasing the intensity of illumination associated with the illumination axis of the lighting arrangement when the current value is greater than the targeted contrast ratio value.

6. The method of claim 1, further comprising determining the estimated position of the priority obstacle based at least in part on the image data, wherein automatically adjusting the lighting system comprises slewing a beam axis of a lighting arrangement to align with the estimated position of the priority obstacle.

7. The method of claim 1, wherein selecting the lighting system comprises dynamically selecting a different external lighting system of the plurality of lighting systems when the current flight phase changes.

8. The method of claim 1, wherein selecting the lighting system comprises selecting a taxi light system of the VTOL aircraft when a searchlight of the VTOL aircraft is locked on a landing location.

9. The method of claim 1, wherein the lighting system comprises one or more illumination elements mounted on an underside of a wing of the VTOL aircraft.

10. A non-transitory computer-readable medium having computer-executable instructions stored thereon that, when executed by a processing system, cause the processing system to:

obtain, from an imaging system associated with a vertical take-off and landing (VTOL) aircraft, image data for a region external to the VTOL aircraft;

identify an analysis portion of the image data within the region based at least in part on a current attitude associated with the VTOL aircraft;

identify a priority obstacle within the analysis portion of the image data from among a plurality of obstacles within the image data based at least in part on ranging data from a ranging system associated with the VTOL aircraft corresponding to a discrete subset of the analysis portion of the image data corresponding to the priority obstacle;

select a lighting system of a plurality of lighting systems associated with the VTOL aircraft based on a current flight phase of the VTOL aircraft; and in response to identifying the priority obstacle:

automatically adjust an illumination axis associated with the lighting system associated with the VTOL aircraft to illuminate the priority obstacle by aligning the illumination axis with an estimated position of the priority obstacle;

dynamically determine a current value for a contrast ratio associated with the discrete subset of the image data encompassing the priority obstacle relative to a remaining subset of the image data within the analysis portion of the image data corresponding to a surrounding environment; and automatically adjust an intensity of illumination associated with the illumination axis of the lighting system based at least in part on a difference between the current value and a targeted contrast ratio value between the priority obstacle and the surrounding environment within the analysis portion of the image data.

11. The non-transitory computer-readable medium of claim 10, wherein the computer-executable instructions cause the processing system to identify the analysis portion by:

determining a safety frame for analysis within the region based at least in part on a current altitude of the VTOL aircraft; and selecting an analysis subset of the image data corresponding to the safety frame, wherein the analysis portion comprises the analysis subset of the image data.

12. The non-transitory computer-readable medium of claim 11, wherein the computer-executable instructions cause the processing system to identify the priority obstacle within the safety frame from among the plurality of obstacles within the safety frame based at least in part on an overlay of the ranging data for the safety frame with the analysis subset of the image data corresponding to the safety frame.

13. The non-transitory computer-readable medium of claim 12, wherein the computer-executable instructions cause the processing system to determine the current value for the contrast ratio associated with the priority obstacle by:

calculating a dynamic contrast ratio value associated with the priority obstacle within the safety frame based on a relationship between a first brightness associated with the discrete subset of the analysis subset of the image data and a second brightness associated with the remaining subset of the analysis subset of the image data.

14. The non-transitory computer-readable medium of claim 10, wherein the computer-executable instructions cause the processing system to:

increase the intensity of illumination associated with the illumination axis of a lighting arrangement when the current value is less than the targeted contrast ratio value; and decrease the intensity of illumination associated with the illumination axis of the lighting arrangement when the current value is greater than the targeted contrast ratio value.

15. The non-transitory computer-readable medium of claim 10, wherein the computer-executable instructions cause the processing system to determine the estimated position of the priority obstacle based at least in part on the image data, wherein automatically adjusting the lighting system comprises slewing a beam axis of a lighting arrangement to align with the estimated position of the priority obstacle.

16. An aircraft system comprising:

an imaging system to obtain image data for a region external to an aircraft;

a ranging system to obtain ranging data for the region external to the aircraft;

one or more avionics systems onboard the aircraft to provide status information indicative of a current state of the aircraft comprising a current attitude and a current flight phase;

a plurality of lighting systems onboard the aircraft; and a control module coupled to the imaging system, the ranging system, the one or more avionics systems and the plurality of lighting systems to provide an obstacle illumination service configurable to:

identify an analysis portion of the image data within the region based at least in part on the current attitude of the aircraft;

identify a priority obstacle within the analysis portion of the image data from among a plurality of obstacles within the image data based at least in part on the ranging data corresponding to a discrete subset of the analysis portion of the image data corresponding to the priority obstacle;

select a lighting system of the plurality of lighting systems associated with the aircraft based on the current flight phase of the aircraft, resulting in a selected lighting system;

automatically adjust an illumination axis associated with the selected lighting system of the plurality of lighting systems to illuminate the priority obstacle by aligning the illumination axis with an estimated position of the priority obstacle;

dynamically determine a current value for a contrast ratio associated with the discrete subset of the image data encompassing the priority obstacle relative to a remaining subset of the image data within the analysis portion of the image data corresponding to a surrounding environment; and automatically adjust an intensity of illumination associated with the illumination axis of the selected lighting system based at least in part on a difference between the current value and a targeted contrast ratio value between the priority obstacle and the surrounding environment within the analysis portion of the image data.

17. The aircraft system of claim 16, wherein the aircraft comprises a vertical take-off and landing (VTOL) aircraft.

18. The aircraft system of claim 16, wherein the obstacle illumination service is configurable to dynamically select a different external lighting system of the plurality of lighting systems when the current flight phase changes.

19. The aircraft system of claim 16, wherein the obstacle illumination service is configurable to select a taxi light system of the plurality of lighting systems when a search-light is locked on a landing location.

20. The aircraft system of claim 16, wherein the selected lighting system comprises one or more illumination elements mounted on an underside of a wing of the aircraft.

* * * * *